Aug. 21, 1928.

R. H. WAPPLER 1,681,507

VEHICLE WINDOW

Filed Jan. 6, 1926

INVENTOR
Reinhold H. Wappler
BY
his ATTORNEY

Patented Aug. 21, 1928.

1,681,507

UNITED STATES PATENT OFFICE.

REINHOLD H. WAPPLER, OF YONKERS, NEW YORK.

VEHICLE WINDOW.

Application filed January 6, 1926. Serial No. 79,589.

My present invention relates to vehicle windows, and has particular reference to windows of closed automobiles.

In automobiles of the closed-body type, it is customary to provide windows which are mounted in the frame work of the body in a manner which permits opening and shutting thereof, and generally by sildably mounting a window pane in association with the frame work in a manner which permits manipulation of the pane to occupy the full opening of the frame or to occupy only desired portions thereof so that the window may be "closed" or "opened" to any desired degree. Generally the window pane is of substantially rectangular configuration and is mounted to open downwardly, that is, in a manner which brings its upper edge into engagement with the upper edge of the frame when the window is closed, and which produces openings of various sizes above the upper edge and between said edge and the upper edge of the frame when the window is lowered.

Accordingly, the window is always either entirely shut, or an opening is produced extending the full width of the frame. Where a window of this character is positioned adjacent to the driver of the vehicle, it is impossible for him to project his arm outwardly through the frame for the purpose of signaling in a manner which is well-known and customary in traffic, unless the window is opened to a considerable degree. Where the necessity for signalling is frequent, as in heavy traffic, it is practically essential to keep the window opened to a considerable degree for a considerable period of time, and the consequent draft which is produced by the rush of air through the window is not only uncomfortable and annoying to the driver and to the other occupants of the car but injurious to the health of the driver.

It is an object of the present invention to provide a window structure which permits the driver to project his arm but which is so constructed and arranged that a draft is not only prevented, but an outward current of air is induced which fulfills a thorough ventilating purpose.

Another object is to provide an auxiliary window which may be associated with the ordinary window of a car in a manner whereby a composite window structure is produced having the features of my invention.

The objects generally of my invention are to provide a device of this character which is of simple construction, inexpensive to manufacture, and capable of installation with great facility and in a manner requiring absolutely no skill.

A feature of my invention lies in providing a window structure wherein advantage is taken of the nature of the air currents which have heretofore produced the undesired draft; and more particularly, it is a feature of the invention to provide a window closure wherein an opening is arranged lying entirely forwardly of the point at which the air currents which have been outwardly deflected by the forward post of the frame return to the plane of the window.

In one embodiment, the window closure may comprise a single pane or window suitably constructed and configured to provide the opening referred to. In a preferred embodiment, the closure is composite by nature, being constituted partly by the usual or main window or sash and partly by an auxiliary smaller window or element suitably constructed and arranged to permit the desired association thereof with the main window.

According to one feature of the invention, an auxiliary window is provided which is applicable to the ordinary window so as to block and close up all of that portion of the normal opening which lies rearwardly of said air-return point, thereby preventing the returning currents of air from blowing into the car and producing an undesired drafty condition.

For the attainment of the foregoing objects, and such other objects as may hereinafter appear or be pointed out, I have illustrated one form of the invention in the accompanying drawings, in which Fig. 1 is an elevational view of a frame provided with a window constructed in accordance with the present invention, the view being taken in a direction looking outwardly of the window;

Figure 2:
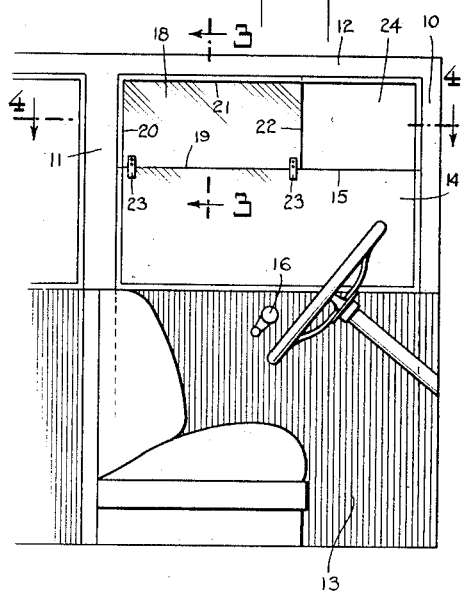
Fig. 2 is a similar view, showing a window constituted of the ordinary type of window in association with an auxiliary window constructed in accordance with the invention.
Figure 3:
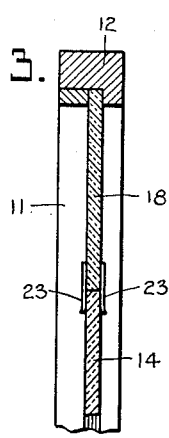
Fig. 3 is a cross-sectional view taken along the line 3—3 of Fig. 2.
Figure 4:
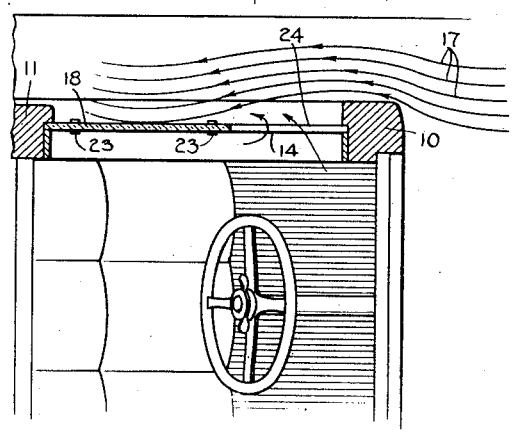
Fig. 4 is a cross-sectional plan view taken along the line 4—4 of Fig. 2.
Figure 5:
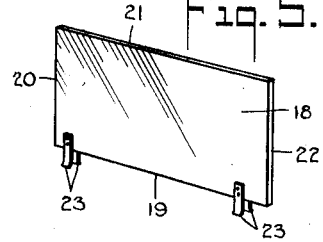
Fig. 5 is a perspective view of the auxiliary window shown in Fig. 2.

Referring now to the drawings, and particularly to Figs. 2, 3, and 4, it will be observed that I have shown, for illustrative purposes, a window frame adjacent to the driver's seat of an automobile. The frame comprises a front post 10, a rear post 11 and a top cross-piece 12. It will be understood that the post 11 may constitute the forward post of a similar window for the rear portion of the automobile, and in general, the elements of the frame may constitute desired portions of the body of the car in accordance with ordinary design. The bottom portion 13 of the frame is preferably totally enclosed in a well-known manner and provided with a chamber into which the window may be moved when it is opened. I have shown a window 14 comprising a substantially rectangular pane of glass having an upper free edge 15. The window is slidably mounted within grooves in the posts 10 and 11, and suitable means such as a hand knob 16 are provided for controlling the up and down movement of the window. It will be understood that the window need not necessarily be rectangular, and it is conceivable that under certain circumstances the cross-piece 12 may be curved and the top edge 15 of the window pane would conform therewith. It is contemplated that the upper edge 15 will engage within a groove in the cross-piece 12 when the window is entirely shut.

Reference to Fig. 4 will indicate clearly how air currents, diagrammatically represented by stream lines 17, will be deflected outwardly by the post 10 and will then return to the plane of the window at some point rearwardly of the post 10. Under ordinary circumstances, this return of the air currents will carry them through the opening produced by the open window and into the interior of the car along paths which sweep past the head and neck of the driver and produce an uncomfortable drafty condition. In accordance with the present invention, I take advantage of this air stream path and provide means for blocking the air stream at the points where it tends to enter the car.

In a preferred embodiment, I provide an auxiliary window 18, comprising preferably a rectangular pane or strip of glass, celluloid, or similar suitable material, designed to be associated with the window 14 in a manner which will effectually block and deflect the air currents which would normally pass into the interior of the car. It will be understood that the particular configuration of the auxiliary window 18 is optional and will depend upon the construction and arrangement of the main window. However, it is contemplated that the auxiliary window 18 will have an edge 19 adapted to conform to the edge 15, so that these edges may be brought into abutting or closely adjacent positions whereby the auxiliary window 18 will constitute a continuation of a portion of the window 14. It is also contemplated that the rear side edge 20 of the window 18 and the top edge 21 thereof will have a configuration which will permit the edge 21 to engage and conform with the groove in the cross-piece 12, and which will permit the side edge 20 to engage with the similar groove in the post 11. The forward free edge 22 of the auxiliary window 18 may be of any desired configuration. For the purposes of rendering the auxiliary window inexpensive from the point of manufacture and suitable for association with car windows of usual construction, I prefer to construct it in the form of a rectangle as illustrated in the drawings.

Although the lower edge 19 may be brought into close engagement with the upper enge 15 in a number of ways, I prefer to arrange these edges in abutting relation, and I prefer to provide depending pairs of cleats 23 carried by the window 18 and adapted to grip and engage the window 14. Preferably the thickness of the window 18 will be the same as that of the window 14, and consequently the space between each two cleats will be substantially equal to this thickness, although if desired, this space may be made somewhat smaller so that greater frictional engagement between the cleats and the pane 14 will result.

Reference to Fig. 2 will show how the auxiliary window will appear when associated with the main window 14. It will be obvious that for the purpose of accomplishing this association, the window 14 must be lowered to a point slightly lower than that shown in the drawings, and after the auxiliary window 18 has been associated therewith, manipulation of the knob 16 will tend to close the window 14 and will consequently bring the upper edge 21 into contact and engagement with the cross-piece 12. The length of the auxiliary window 18 being shorter than the total overall width of the window 14, the rear portion of the opening which would normally have been produced by the window 14 alone is closed, and only a forwardly disposed opening 24 remains. In accordance with the invention, the opening 24 lies entirely forwardly of the foremost point at which the air streams 17 return to the plane of the window. Accordingly, there will be no inflow of air through the opening 24, but rather a slight outflow due to the rarefaction produced just outside of this opening by the passage of the streams 17. In this manner, a drafty condition is entirely prevented, and yet a space is provided through which the driver may project his arm and through which effective ventilation of the interior of the car results. That this outward ventilating draft exists, is borne out by the fact that tobacco smoke will visibly follow a path forwardly to the opening 24 and thence out of the opening.

Figure 1:
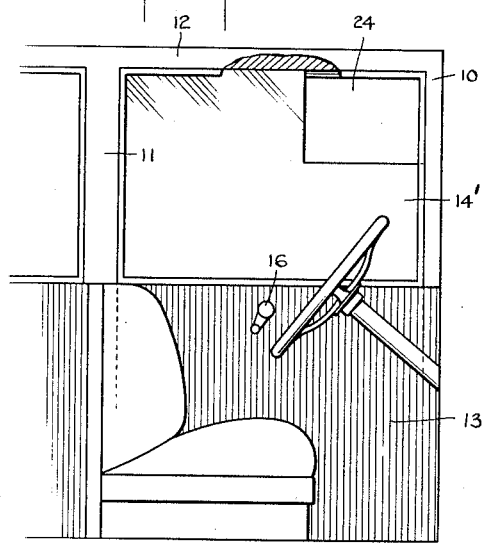

In Fig. 1, I have illustrated a construction wherein the opening 24 is produced by cutting out a portion of an integral window pane or closure 14'. The window structure of the invention is, in this case, comprised of this integral pane, as contradistinguished from the composite structure which is illustrative of a preferred method of effecting the same ultimate result. In a construction of the character shown in Fig. 1, total closure of the window space is impossible at any time; nevertheless no discomfort is ever afforded to the occupants of the car, and the necessity for associating a separate auxiliary window will be obviated.

Having thus described my invention and illustrated its use, what I claim and desire to secure by Letters Patent follows.

I claim:—

1. In a windowed vehicle of the type which normally deflects air outwardly relative to the window during the movement of the vehicle and wherein a deflected air stream normally returns to the plane of the window, an openable window closure so constructed and arranged that when it is completely closed it will close up all but the upper forward window portion, thereby leaving an opening which lies forwardly of the point at which the air stream returns to the plane of the window.

2. In a vehicle having a window frame, said vehicle being of the type which deflects air outwardly relative to said frame during the normal movement of the vehicle and wherein a deflected air stream normally returns to the plane of the window, a window closure slidably mounted within the frame to permit opening and shutting thereof, said closure being so shaped with respect to the shape of said frame that when the closure is completely shut an opening is produced between the upper forward edge of the closure and the frame, said opening lying in its entirety forwardly of the point at which the air stream returns to the plane of the window.

3. In a vehicle having a window frame, said vehicle being of the type which deflects air outwardly relative to said frame during the normal movement of the vehicle and wherein a deflected air stream normally returns to the plane of the window, a window closure vertically slidable within the frame to permit opening and shutting thereof, said closure having an opening in the forward upper portion thereof, said opening being arranged to lie in its entirety forwardly of the point at which the air stream normally deflected by the vehicle returns to the plane of the window, whereby when the closure is completely shut an opening for the outward projection of the arm of a passenger is provided while at the same time an inward draft is effectually prevented.

4. For use with a vertically openable window of a closed automobile, said automobile being of the type which deflects air outwardly relative to said window during its movement and wherein said deflected air normally returns to the plane of the window, an auxiliary window adapted to be removably associated with said openable window, said auxiliary window being so constructed that when so associated it will form a continuation of a rear portion of the openable window, whereby a closing up of all but a predetermined forward portion of the opening produced by the openable window will be effected, said forward portion defining an opening which lies forwardly of the point at which the air stream returns to the plane of the window.

5. For use with a main openable window of a vehicle, said vehicle being of the type which normally deflects air outwardly relative to said window during the movement of the vehicle and wherein a deflected air stream normally returns to the plane of the window, an auxiliary window adapted to be removably associated with said main window, said auxiliary window being arranged and constructed to form a continuation of only that rear portion of the main window at which the deflected air stream returns to the plane of the window, whereby said association will close up all but a forward portion of the opening produced by opening the main window, and said auxiliary window comprising a transparent strip certain of whose edges conform with the exposed edge of the main window and with the rear portion of the window frame.

In witness whereof, I have signed and sealed this specification this 28th day of December, 1925.

REINHOLD H. WAPPLER.